United States Patent [19]

Yokota

[11] Patent Number: 4,688,950
[45] Date of Patent: Aug. 25, 1987

[54] ROLLER BEARING FOR LINEAR MOVEMENT

[75] Inventor: Yasunori Yokota, Ebina, Japan

[73] Assignee: Nippon Thompson Co., Ltd., Tokyo, Japan

[21] Appl. No.: 625,073

[22] Filed: Jun. 26, 1984

[51] Int. Cl.⁴ .............................................. F16C 29/06
[52] U.S. Cl. ...................................................... 384/44
[58] Field of Search ........................ 384/43, 44, 45, 50, 384/55

[56] References Cited

U.S. PATENT DOCUMENTS

| | | | |
|---|---|---|---|
| 4,426,119 | 1/1984 | Mottate | 384/45 |
| 4,496,198 | 1/1985 | Geka | 384/44 |
| 4,511,189 | 4/1985 | Mottate | 384/44 |
| 4,556,262 | 12/1985 | Geka | 384/44 |

Primary Examiner—Stanley N. Gilreath
Assistant Examiner—David Werner
Attorney, Agent, or Firm—Alan H. MacPherson; Richard Franklin; Thomas S. MacDonald

[57] ABSTRACT

A linear motion roller bearing for allowing an object such as a slider to move along a straight line defined, for example, by a track rail includes an endless path and a plurality of rollers having substantially the same size in diameter and height, which are arranged in contact in the endless path with their axes of rotation directed as rotated over 90° alternately with respect to the longitudinal axis of the endless path. The endless path includes a pair of straight portions and a pair of semicircularly curved portions each of which connects the corresponding ends of the pair of straight portions. Each of the curved portions is so structured that the maximum number of rollers which can be present therein ranges between (even number +0.1) and (even number +0.5) if the pair of straight portions are not provided on the same horizontal plane and between (integer +0.1) and (integer +0.5) if the pair of straight portions are provided on the same horizontal plane or a plane close thereto.

6 Claims, 37 Drawing Figures

ROLLER BEARING FOR LINEAR MOVEMENT

BACKGROUND OF THE INVENTION

1. Field of the Invention

This invention generally relates to a roller bearing and particularly to a roller bearing for linear movement of an object. More specifically, the present invention relates to a particular shape of an endless path for rollers of a roller bearing which allows an object to move along a straight line. Still more specifically, the present invention is concerned with an endless path for rollers of a roller bearing for a linear movement of an object, wherein the rollers having the same size in diameter and longitudinal length are arranged in the path with their axes of rotation rotated over 90° alternately with respect to the direction of movement of the rollers or the longitudinal axis of the path.

2. Description of the Prior Art

A prior art roller bearing for linear movement of an object is schematically shown in FIGS. 22 and 23. As shown, a plurality of cylindrical rollers 50 having substantially the same size in diameter and longitudinal length are rotatably retained by a chain-shaped retainer 51 such that the rollers 50 are arranged with their axes of rotation rotated over 90° alternately with respect to the direction of movement of the rollers. An endless path 55 is defined by a straight load path 52, a straight return path 53 in parallel with the load path 52 and a pair of semicircularly curved paths 54, 54 connecting the ends of the load and return paths. It is to be noted that such a roller bearing for linear movement of an object is typically provided in a pair as arranged symmetrically with respect to the center line of linear movement of the object. Thus, as the rollers move along the endless path, the object can move along a predetermined straight path.

However, in the above-described prior art structure, because of the presence of the retainer 51, the number of rollers 50 provided in the endless path 55 is limited. Described more in detail, the fewer the number of rollers 50 in the load path 52, the lower the load bearing capability as a linear motion roller bearing. As a result, the scope of practical applications tends to become limited. On the other hand, if the load bearing capability is increased, the roller bearing tends to become large in size. Moreover, since the endless path 55 of the above-described prior art structure lies on a horizontal plane, there has also been a difficulty in making the roller bearing or its endless path smaller in size.

In order to obviate the above-described defects, there has been proposed a direct contact type linear motion roller bearing having no retainer for a plurality of rollers which circulate along the endless path in direct rolling contact between the adjacent ones with their axes of rotation directed as rotated over 90° alternately with respect to the longitudinal axis of the endless path. In this direct contact type roller bearing, the number of rollers to be provided in the endless path may be increased because of the absence of the roller retainer so that the load bearing capability may be increased correspondingly. Furthermore, in order to make such a linear motion roller bearing smaller in size, in particular narrower in width, it has been proposed to provide the return path obliquely above or below the load path. In this case, there is an increased freedom in designing the connecting curved paths connecting the ends of the load and return paths. For example, the connecting curved paths may be provided to lie in the plane defined by the load and return paths or they may be provided to have a three dimensional shape. In such a case, however, the rollers tend to slip at the joint between the straight, load and return, and curved paths, in particular at the joint between the load path 3 and the connecting curved path 5. With such a slip, which is often called "stick" slip, the resistance of the linear motion roller bearing is higher, so that it is desirable to design the connecting curved paths having a minimum of slip or no slip between the rollers and the endless path.

SUMMARY OF THE INVENTION

It is therefore a primary object of the present invention to obviate the disadvantages of the prior art as described above and to provide an improved linear motion roller bearing.

Another object of the present invention is to provide an improved roller bearing for linear movement of an object which is low in resistance and thus smooth in operation.

A further object of the present invention is to provide an improved linear motion roller bearing which is smaller in size.

A still further object of the present invention is to provide an improved linear motion roller bearing whose slippage between the rollers and the endless path is minimized or virtually eliminated.

Other objects, advantages and novel features of the present invention will beccme apparent from the following detailed description of the invention when considered in conjunction with the accompanying drawings.

DESCRIPTION OF THE PREFERRED EMBODIMENTS

Figure 1:
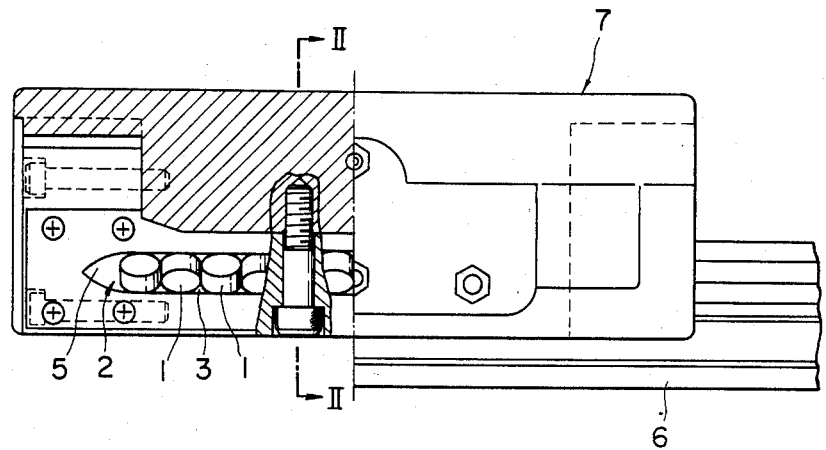
FIG. 1 is a partially cross-sectional side view, taken along line I—I in FIG. 2, showing one embodiment of the linear motion roller bearing provided in a casing 7 which moves along a straight track rail 6.

As shown in FIGS. 1 through 5, the linear motion roller bearing of the present invention is provided in the casing 7 which straddles the straight track rail 6. Thus, the casing 7 may move along the rail 6 while the rollers 1 of the roller bearing roll along the endless path 2, which is defined in the casing 7, indefinitely. In the linear motion roller bearing of the present invention, the rollers 1 are cylindrical or columnar in shape and are substantially the same size in diameter and longitudinal length. These rollers 1 are arranged in the endless path 2 to be in direct rolling contact between the adjacent ones with their axes of rotation directed perpendicular to the longitudinal axis or center line of the endless path and rotated over 90° alternately with respect to the longitudinal axis. The endless path along which the rollers 1 roll indefinitely includes the straight load path 3, straight return path 4 in parallel with the load path 3 and the two semicircularly curved connecting paths 5, 5 each connecting the corresponding ends of the load and return paths.

Figure 2:
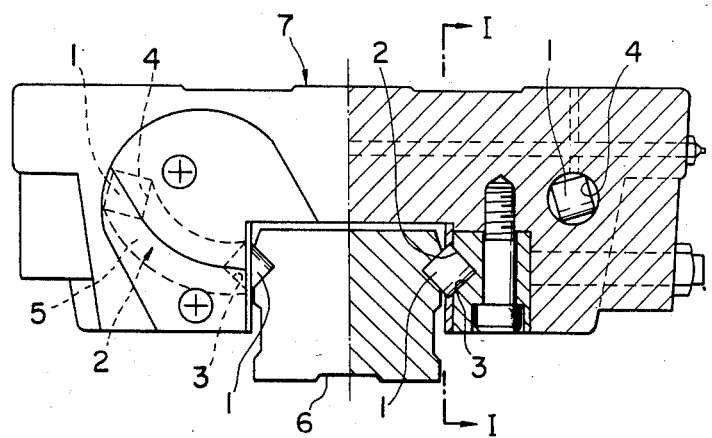
FIG. 2 is a partially cross-sectional front view, taken along line II—II in FIG. 1.
Figure 3:
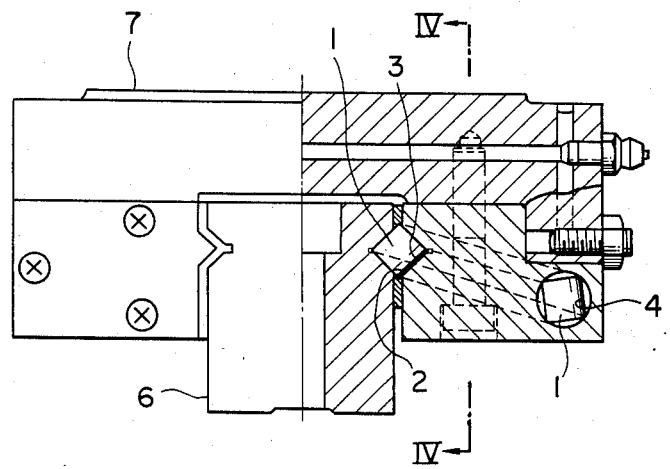
FIG. 3 is a partially cross-sectional front view, taken along line III—III in FIG. 4, showing another embodiment of the liner motion roller bearing.
Figure 4:
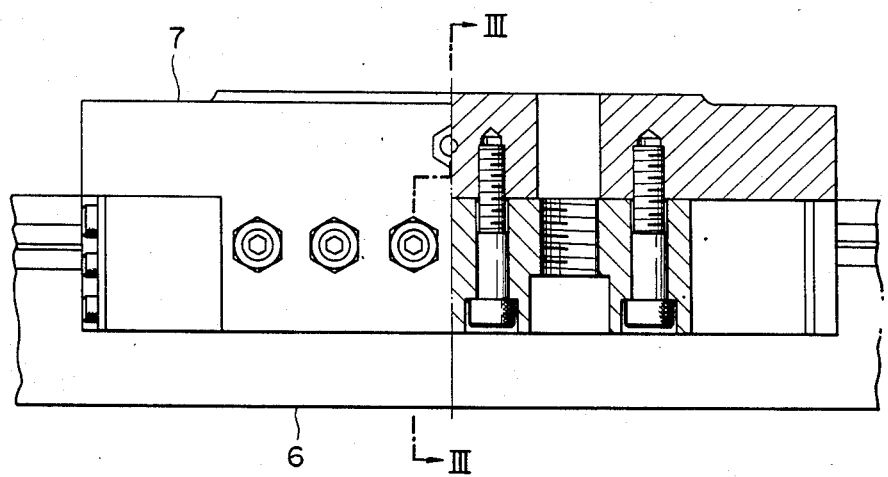
FIG. 4 is a partially cross-sectional side view, taken along line IV—IV in FIG. 3.

In the embodiment shown in FIGS. 1 and 2, the return path 4 is provided not on the horizontal plane including the load path 3 but obliquely above the load path 3. As best shown in FIG. 2, the load path 3 is, in fact, defined by a pair of V-shaped grooves each formed in the rail 6 and the casing 7; on the other hand, the return path 4 is defined in the casing 7 as a passage, which is circular in cross-sectional shape in the illustrated example. As shown, linear a motion roller bearing is provided on each side of the rail 6 thereby allowing the casing 7 to move along the rail 6 smoothly. In the embodiment shown in FIGS. 3 and 4, the return path 4 is provided obliquely somewhat below the load path 3. By designing the endless path 2 in this manner, the linear motion roller bearing may be made smaller in size. In the first embodiment shown in FIGS. 1 and 2, the curved connecting path 5 connecting the ends of the load and return paths is also curved in shape when projected to a plane which is perpendicular to the moving direction of the casing 7. On the other hand, in the embodiment shown in FIGS. 3 and 4, the curved connecting path 5 is straight when projected to a plane which is perpendicular to the moving direction of the casing 7. It is to be noted, however, that the curved connecting path 5 may take any other appropriate shape as long as the later-described "stick" slip preventing conditions are met.

Figure 6:
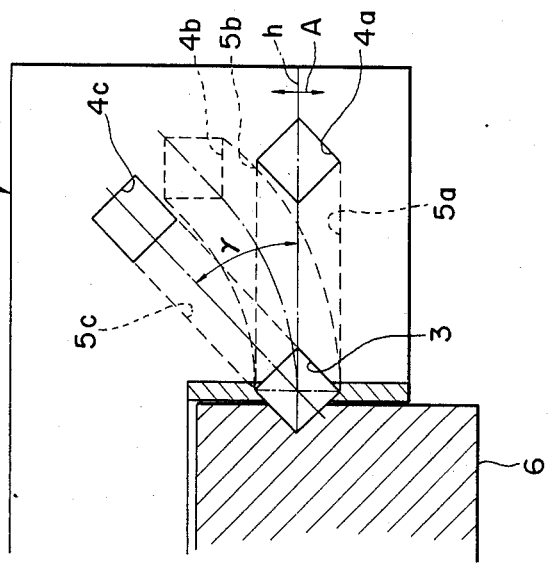
FIG. 6 is a schematic illustration showing the several possible arrangements of the endless path comprised of load, return and curved paths, 3, 4 and 5, respectively.

The present inventor has found that in the case where the angle $\gamma$ formed between the straight line passing through the centers of load and return paths 3 and 4 and the horizontal line passing through the center of load path 3 is not equal to 0, as shown in FIG. 6, the variation in the total number of rollers 1 in the curved path 5 or the variation of travel distance between the incoming and outgoing rollers 1 becomes substantially small if the curved path is so structured that the maximum number of rollers 1 which can be present in the curved path 5 ranges between (even number $+0.1$) and (even number $+0.5$) there assuming is no gap between the adjacent rollers 1. In particular, such a variation becomes minimum if the number of rollers 1 which can be present in the curved path 5 is close to (even number $+0.3$). If such a variation in the number of rollers 1 in the curved path 5 is appreciable, there will be an appreciable fluctuation in the movement of the rollers 1 through the curved path 5, and, thus, the circulating velocity of the rollers 1 changes rapidly with a small amplitude. As a result, the rollers 1 move along the endless path 2 with rapid changes in velocity. Thus, the smaller the variation in the number of rollers 1 in the curved path, the smoother the movement of the rollers 1 along the endless path 2, thereby reducing the occurrence of "stick" slip.

As described previously, the return path 4 may be located at any desired position with respect to the load path 3. As shown in FIG. 6, the return path 4 may be located at the position 4a which lies in the horizontal plane including the center axis of the load path 3 with the curved path 5 also lying in the same horizontal plane at the position 5a. As indicated by the arrow A, the return path 4 may be located above or below the horizontal plane h. For example, the return path 4 may be located at the position 4b with the curved path 5 located at the position 5b, in which case the curved path 5 has a shape which changes with respect to three dimensions. The return path 4 may also be located at the position 4c with the curved path 5c extending between the paths 3 and 4 at 45° with respect to the horizontal plane h.

Figure 7:
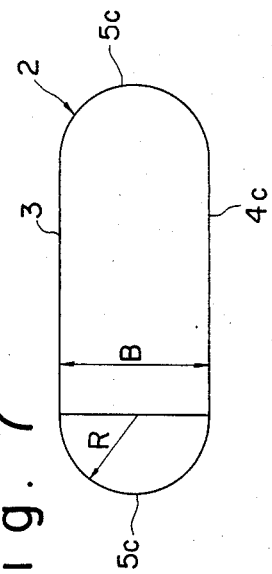
FIG. 7 is a schematic illustration showing the overall structure of the endless path 2 along which the rollers of the present linear motion roller bearing roll.
Figure 5:
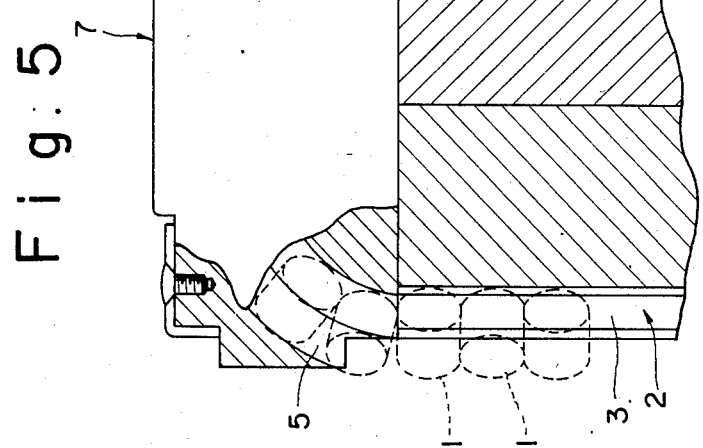
FIG. 5 is a fragmentary and partially cross-sectional plan view showing the right-half of the casing 7.

In the following, in order to facilitate analysis by simplifying the structure, it will be assumed that $\gamma = 45°$ and the curved connecting path 5 is located at the position 5c thereby lying in the plane including the load path 3 and the return path 4. The endless path 2 lying in the plane defined by the load and return paths 3 and 4c is shown in FIG. 7, and it includes the straight load path 3, straight return path 4c in parallel with and separated away over a distance B from the load path 3 and a pair of semicircularly curved paths 5c, 5c each defined by a semicircle with a radius $R = B/2$.

Figure 8A:
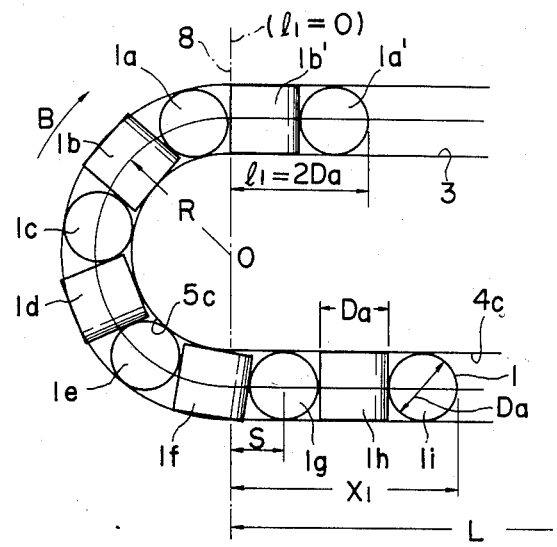
FIGS. 8a through 8c are schematic illustrations which are useful for explaining how the number of rollers at the curved connecting portion 5 vary as the rollers 1 roll along the path.
Figure 8B:
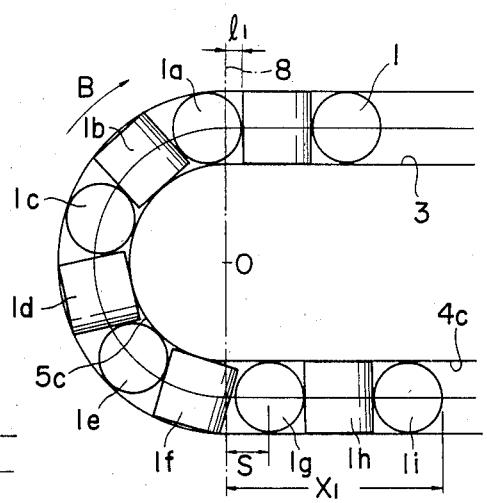
Figure 8C:
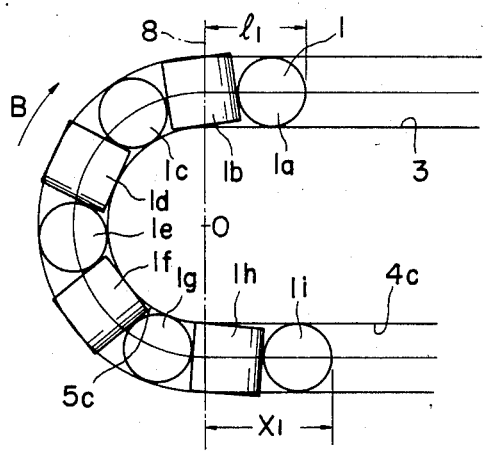

FIGS. 8a through 8c show how the rollers 1 in the endless path 2, in particular its curved path 5c move. As shown, the rollers 1 are arranged as being in contact between the adjacent ones and rotated over 90° alternately with respect to the center axis of the endless path 2. All of the rollers 1 have the same diameter and height or longitudinal length, which are indicated by $D_a$ here. As shown in FIG. 8a, the rollers 1 move into the curved path 5c from the return path 4c and at the same time the rollers 1 move out of the curved path 5c into the load path 3. It is assumed that there is no gap between the adjacent rollers 1 in the curved path 5c and thus the adjacent rollers 1 are in contact. The rollers present in the curved path 5c are identified by 1a through 1f and these rollers move in the direction indicated by the arrow B along the curved path 5c.

FIG. 8a shows the condition in which the roller 1a comes to be aligned at a boundary 8 between the load and curved paths 3 and 5c. Under this condition, the distance between the front side of the leading roller 1a and the boundary 8 is zero, i.e., $l_1 = 0$. Then, the roller 1a moves to the position indicated in FIG. 8b and then to the position indicated in FIG. 8c, and, furthermore, to the position 1a' indicated in FIG. 8a. Thus, a single period of variation in the number of rollers present in the curved path 5c is completed when the roller 1a has moved to the position 1a' or over the distance $l_1 = 2D_a$.

Figure 9A:
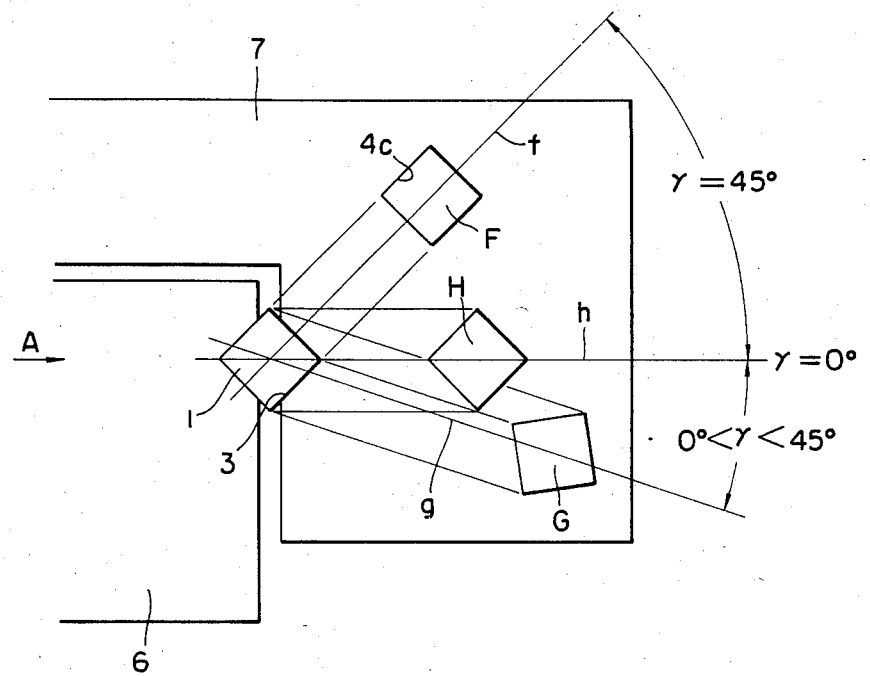
FIG. 9a is a schematic illustration showing the relative positional relation between the load path 3 and the return path 4.
Figure 9B:
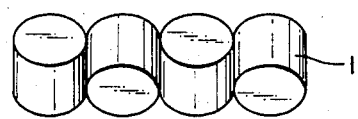
FIG. 9b is a schematic illustration showing the relative orientation between the adjacent rollers 1 which roll along the endless path of the present linear motion roller bearing.

FIG. 9a shows several kinds of fundamental structures for the curved and return paths formed in the casing 7 which moves linearly along the straight rail 6 as supported by the present linear motion roller bearing. In one structure, the return path 4c having a square cross-sectional shape is located obliquely above or below the load path 3 at the position F at an angle of 45° and the curved path interconnecting the load and return paths lies in the plane defined by the center lines of the load and return paths. In another structure, the return path 4c is located at the position H whose center axis lies in the horizontal plane h on which the center line of the load path 3 also lies. In this case, the curved path between the load and return paths is also horizontal. In yet another structure, the return path 4c is located at the position G which is intermediate between the above two positions and, thus, the angle formed between the horizontal plane h and the plane defined by the center lines of load and return paths in this case is between 0° and 45°.

Figure 10A:
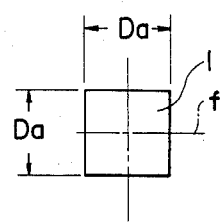
FIGS. 10a through 10f are schematic illustrations showing the relation between the rollers 1 and the endless path, in particular its curved path, in a horizontal plane in several cases of arrangement of the endless path.
Figure 10B:
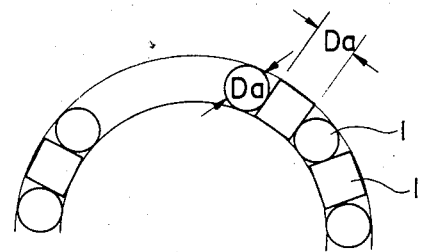
Figure 10C:
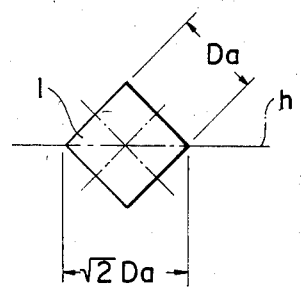
Figure 10D:
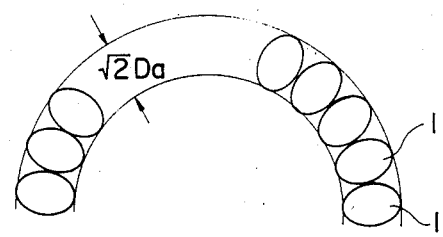
Figure 10E:
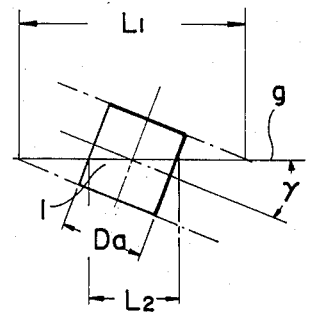
Figure 10F:
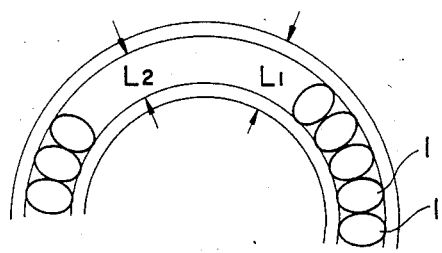

The shapes in cross-section of the rollers 1 taken at the planes passing through the centers of load and return paths in the above-described three cases are shown in FIGS. 10a through 10f. That is, FIGS. 10a and 10b correspond to the case where the return path 4c is located at the position F, $\gamma = 45°$. In this case, the cross-sectional shapes include circles of diameter $D_a$ and squares of side $D_a$. FIGS. 10c and 10d correspond to the case where the return path 4c is located at the position H, $\gamma = 0°$ and, thus, the cross-sectional shapes are all the same ellipse having the major axis of square root 2 times $D_a$ and the minor axis of $D_a$. FIGS. 10e and 10f correspond to the case where the return path 4c is located at the position G, $0° < \gamma < 45°$. In this case, the cross-sectional shapes include ellipses having the major axis of $L_2$ and the minor axis of $D_a$ and truncated ellipses having the major axis of $L_1$ and the minor axis of $D_a$ cut with $L_2$ in the direction of the major axis. In what follows, a detailed analysis of the total number of rollers in the curved path based upon the variation of travel distance between the incoming and outgoing rollers will be given for each of the above three cases.

I. $\gamma = 45°$

Figure 11A:
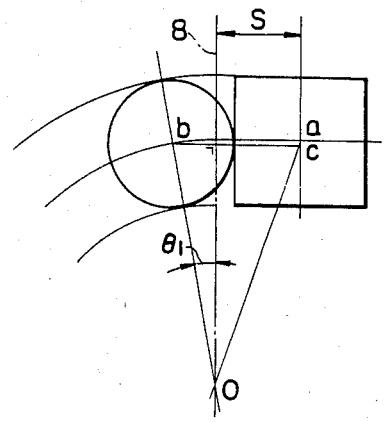
FIGS. 11a, 11b, 12a, 12b, 13, 14, 15a, 15b, 16a and 16b are schematic illustrations which are useful for explaining the principle of the present invention.
Figure 11B:
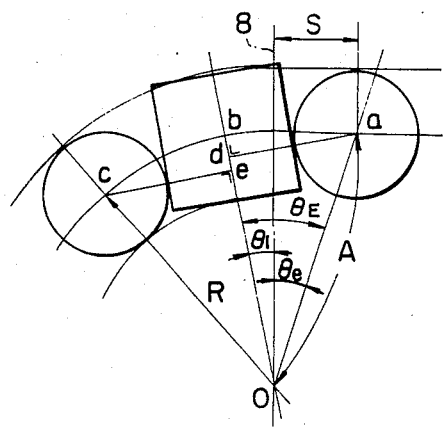
Figure 12A:
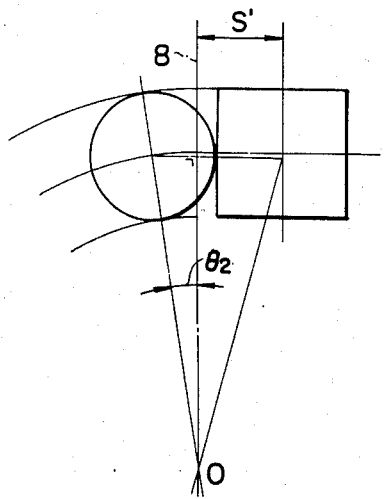
Figure 12B:
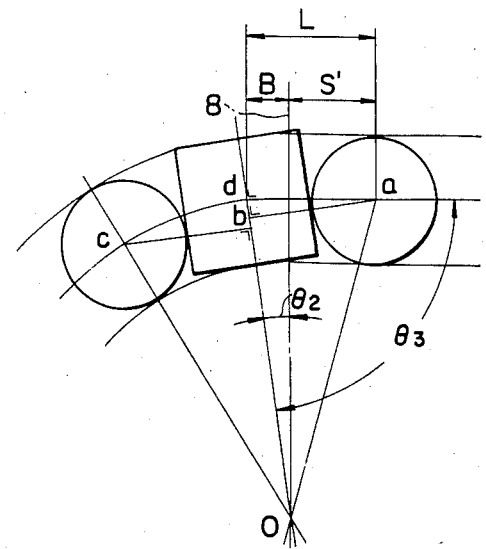

FIGS. 11a and 11b are the drawings to be used for the analysis at the inlet section from the straight path to the curved path and FIGS. 12a and 12b are the drawings to be used for the analysis at the outlet section from the curved path to the straight path. In FIGS. 11a and 11b, the following relations hold.

$D_a \neq \overline{ab}$ and $D_a = \overline{bc}$ $\theta_1 = \sin^{-1}((D_a - S)/R)$ $2 \times D_a \neq \overline{ac}, D_a = \overline{ad} = \overline{ce}, cO = \overline{bO} = R$ with $\overline{aO} = A,$ $A = \sqrt{R^2 + S^2}$ $\theta_E = \sin^{-1}(D_a/A)$ $\theta_e = \tan^{-1}(S/R)$ $\theta_1 = \theta_E - \theta_e$ On the other hand, in FIGS. 12a and 12b, the following relations hold.

Figure 18:
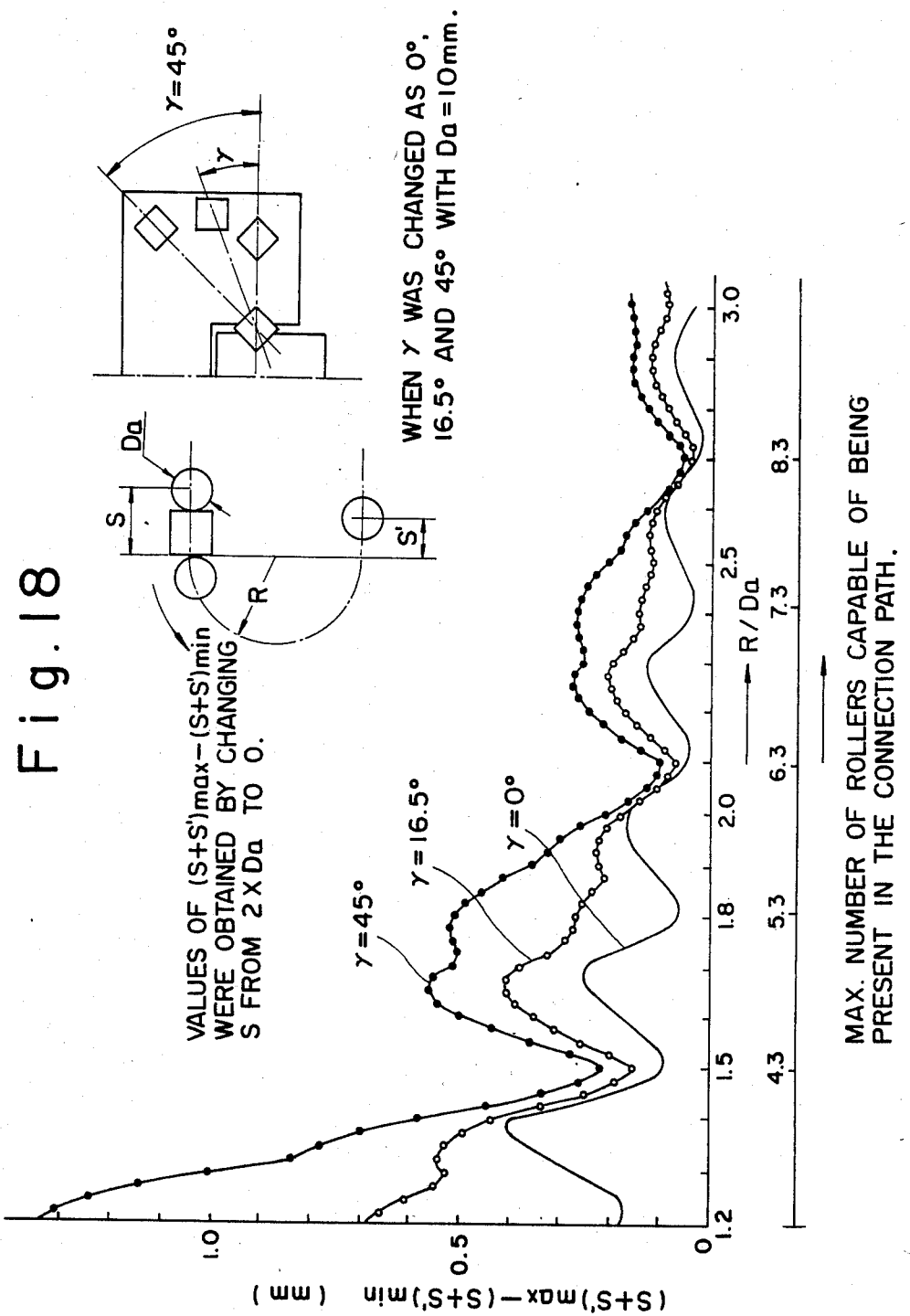
FIG. 18 is a graph showing variation in difference between incoming and outgoing travelling distances of rollers at the curved path.

$S' = D_a - R \cdot \sin\theta_2$ angle
$adO = \theta_3 = 90° - \theta_2$ $L = D_a/\sin\theta_3$ $B = R \cdot \tan\theta_2$ $S' = L - B$ From the analysis of the relations described above, the results for the case of $\gamma = 45°$ as shown in FIG. 18 may be obtained.

II. $0° < \gamma < 45°$

Figure 13:
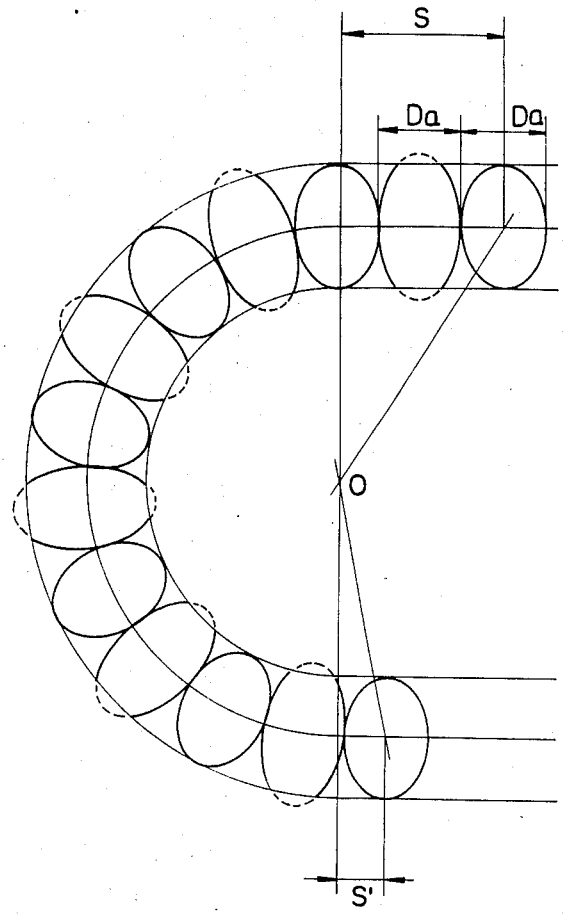
Figure 14:
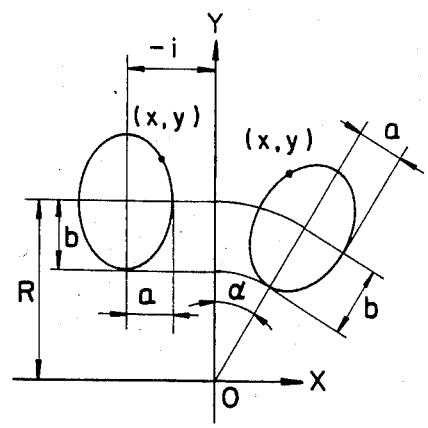

As shown in FIG. 13, two kinds of ellipses, truncated larger ellipses and smaller ellipses, are arranged alternately with the adjacent ones in contact. With the larger ellipses designated by BC see FIG. 15a and the smaller ellipses designated by S, if the centers of ellipses are located in the straight path in FIG. 14, we have the following relations.

B ellipse $$\frac{(x+i)^2}{(D_a/2)^2} + \frac{(y-R)^2}{(D_a/2\cos(45° + \gamma))^2} = 1$$

S ellipse $$\frac{(x+i)^2}{(D_a/2)^2} + \frac{(y-R)^2}{(D_a/2\cos(45° - \gamma))^2} = 1$$

on the other hand, in the case where the centers of ellipses are located in the curved path, we have the following relations.

B ellipse $$\frac{(x\cos\alpha - y\sin\alpha)^2}{(D_a/2)^2} + \frac{(x\sin\alpha + y\cos\alpha - R)^2}{(D_a/2\cos(45° + \gamma))^2} = 1$$

S ellipse

-continued $$\frac{(x\cos\alpha - y\sin\alpha)^2}{(D_a/2)^2} + \frac{(x\sin\alpha + y\cos\alpha - R)^2}{(D_a/2\cos(45° - \gamma))^2} = 1$$

The above relations may be summarized as follows:

| Position of ellipse | Basic equation |
|---|---|
| curved path | $\frac{(x+i)^2}{a^2} + \frac{(y-R)^2}{b^2} = 1$ |
| straight path | $\frac{(x\cos\alpha - y\sin\alpha)^2}{a^2} + \frac{(x\sin\alpha + y\cos\alpha - R)^2}{b^2} = 1$ | where, $a = D_a/2$ $b = \frac{D_a}{2\cos(45° + \gamma)}$  B ellipse $b = \frac{D_a}{2\cos(45° - \gamma)}$  S ellipse In order to solve for x by rearranging the above equations, we define $T_1 = a^2\sin^2\alpha + b^2\cos^2\alpha$ $T_2 = a^2\cos^2\alpha + b^2\sin^2\alpha$ $T_3 = (a^2 - b^2)\sin\alpha\cdot\cos\alpha$ $T_4 = a^2 R\sin\alpha$ $T_5 = a^2 R\cos\alpha$ $T_6 = a^2(R^2 - b^2)$.

Thus, in the straight path, we have $$x = -i + a\sqrt{1 - \frac{(y-R)^2}{b^2}} \quad (1)$$

and, in the curved path, we have $$x = \frac{T_4 - T_3 y - \sqrt{(T_3 y - T_4)^2 - T_1(T_2 y^2 - 2T_5 - 2T_5 y + T_6)}}{T_1} \quad (2)$$

Figure 15A:
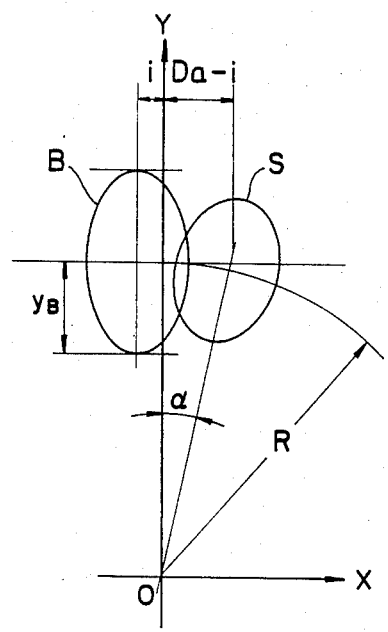
Figure 15B:
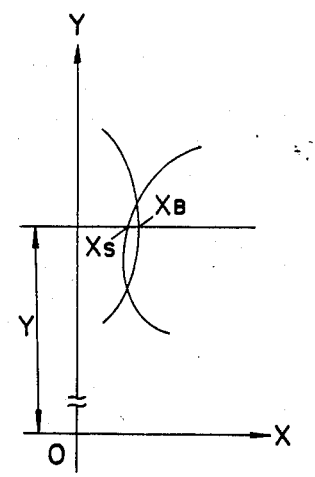

Using the above equations (1) and (2), the relation between S and S+S' in FIG. 13 will be obtained. FIGS. 15a and 15b show one example of analysis at the inlet section from the straight path to the curved path, and FIGS. 16a and 16b show one example of analysis at the outlet section from the curved path to the straight path.

In FIGS. 15a and 15b, since the B ellipse is fixed in position at $X = -i$ and $Y = R$, the S ellipse is moved along a circle defined by a radius R from the position of $\alpha = \tan^{-1}(D_a - i)/R$ and $Y = R$ by incrementing the angle $\alpha$ by $\Delta\alpha$ and determine the values of $X_B$ and $X_S$. The value of Y is changed from R to $R - Y_B$. The relation between $X_B$ and $X_S$ in this case is such that if $X_S > X_B$, the contact point between the two ellipses is located either above or below the value of Y, and if $X_S < X_B$, the contact point is within the range. From this, while increasing $\alpha$, the contact point between the two ellipses is the position where $(X_S - X_B)_{max}$ becomes 0. Thus, the value of $\alpha$ under the condition is an angle between the centers of two ellipses when these are in contact at one point.

Figure 16A:
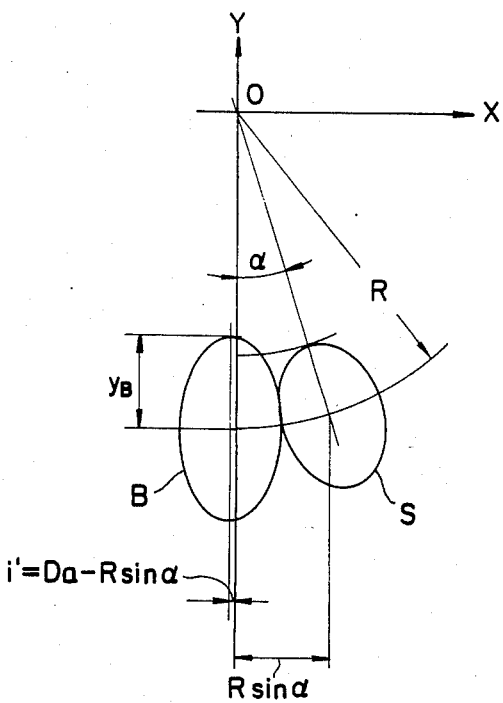
Figure 16B:
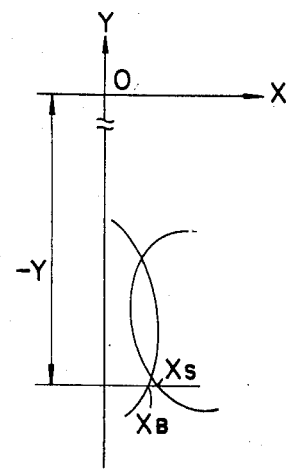

Referring to FIGS. 16a and 16b, the contact point between the two different ellipses at the outlet section from the curved path to the straight path may be obtained as in the following manner. As shown, since the angle $\alpha$ of S ellipse is fixed, the value of Y is changed from $-R$ to $-R + Y_B$ by incrementing the value of $i'$ by $\Delta i'$ to determine $X_B$ and $X_S$. The relation between $X_B$ and $X_S$ is similar to that at the inlet section, and, thus, the position where $(X_B - X_S)_{max} = 0$ holds is the condition in which the two ellipses are in contact at one point. Thus, the value of $i'$ under the condition is the distance from the boundary to the center of ellipse.

III. $\gamma = 0°$

The analysis for the condition of $\gamma = 0°$ may be easily obtained by setting $\gamma = 0°$ and B ellipse = S ellipse in the previous analysis II.

Figure 17A:
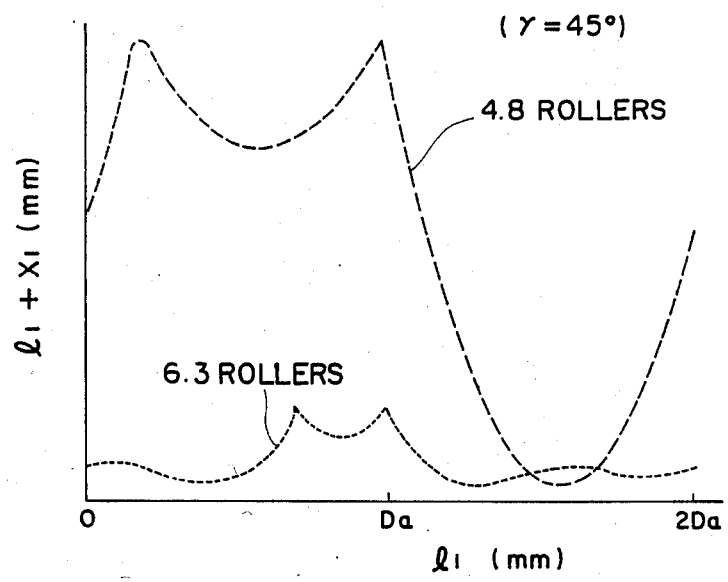
FIGS. 17a and 17b are graphs showing variation in the travelling distance of rollers at the curved path as the rollers roll.
Figure 17B:
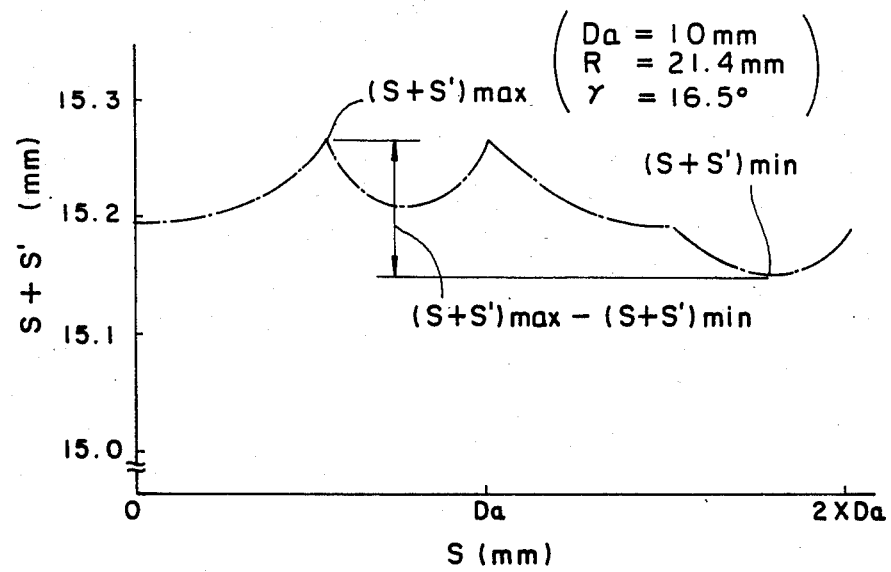

Now, FIG. 17a shows the relation between $l_1$ and $l_1 + X_1$ ($l_1$ and $X_1$ are defined in FIG. 8a) for the case of $\gamma 45°$ under particular conditions. The numbers in the graph of FIG. 17a indicate the maximum number of rollers which may be present in the curved path. On the other hand, FIG. 17b is a graph showing the relation between S and S+S' and S' are defined in FIG. 13 for the case of $0° < \gamma \leq 45°$ ($\gamma = 16.5°$). In this manner, values of S, S' and $(S+S')_{max} - (S+S')_{min}$ are obtained under various conditions, and the thus obtained values of $(S+S')_{max} - (S+S')_{min}$ are plotted as a function of nondimensionalized radius $R/D_a$ of the curved path in the graph as shown in FIG. 18.

From the results shown in the graph of FIG. 18, we can conclude as follows:

In a linear motion direct contact type roller bearing having a curved path defined by a semicircle for connecting the load path to the return path, it is preferred to form the curved path such that (1) the maximum number of rollers enterable in the curved path is approximately integer +0.3 (practically, an integer +0.1 to an integer +0.5 at $\gamma = 0°$ or its vicinity; and (2) the maximum number of rollers enterable in the curved path is approximately even number +0.3 (practically, an even number +0.1 to an even number +0.5) when $0° < \gamma 45°$.

That is, FIG. 18 is a graph showing the plots of the values $(S+S')_{max} - (S+S')_{min}$ which have been obtained by changing S from $2D_a$ to 0 for $D_a = 10$ mm with $\gamma$ as a parameter at $0°$, $16.5°$ and $45°$. As shown in the graph of FIG. 18, the ordinate is taken for $(S+S')_{max} - (S+S')_{min}$ and the abscissa is taken for $R/D_a$ or the maximum number of rollers which can be present in the curved path. It is easily seen from the graph of FIG. 18 that for the case of $\gamma = 0°$, minimums are present at the maximum number of rollers defined by (integer +0.3); on the other hand, for the cases of $\gamma = 16.5°$ and $45°$, minimums are present at the maximum number of rollers defined by (even number +0.3).

Now, in order to consider the length of the endless path for the rollers 1, it will first be considered as to the length L of load and return paths 3 and 4 for the case of $\gamma = 45°$ as shown in FIGS. 8a through 8c. FIG. 17a shows the curve of incoming and outgoing amount $l_1 + X_1$ with respect to the curved path as an example when the travelling distance $l_1$ of roller 1 changes from 0 to $2D_a$ in the structure shown in FIG. 8. On the other hand, FIG. 17b shows the curve of the incoming and outgoing amount $S+S'$ of the roller 1 with respect to the curved path when the travelling distance S is changed from 0 to $2D_a$ in a particular case of $\gamma=16.5°$ in FIG. 13. It is to be noted that the above results have been obtained for one of the two curved paths which are provided on both ends of the straight load and return paths. Thus, if the characteristics in the movement of the rollers 1 may be represented by the curves shown in FIGS. 17a and 17b at one of the two curved connecting paths, it is preferable to provide the other curved connecting path which gives characteristic curves in the movement of the rollers 1 out of phase by 180°. If so structured, the variations in the incoming and outgoing amount at both of the curved connecting paths cancel out each other.

Figure 19A:
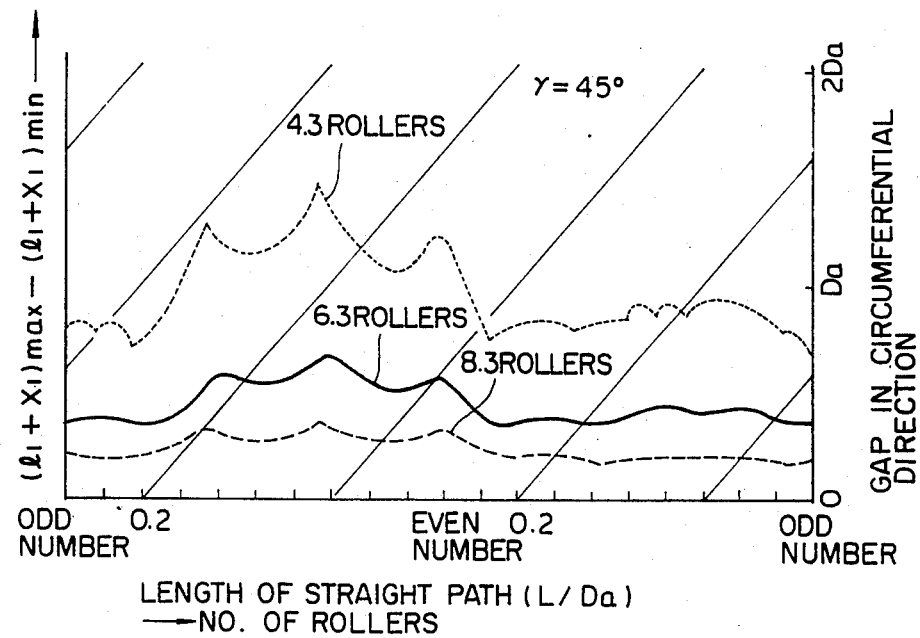
FIGS. 19a and 19b are graphs each showing variation in difference between incoming and outgoing travelling distances of rollers as a function of the length of straight the path.
Figure 19B:
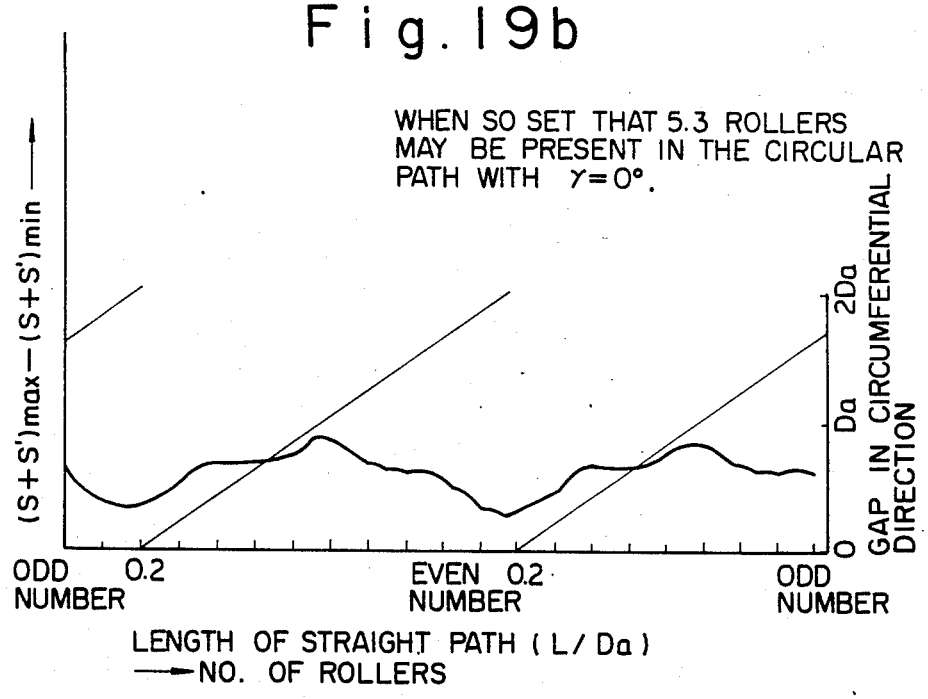

The variation of incoming and outgoing amount is shown as a function of the length L of the straight path in FIGS. 19a and 19b. As a matter of course, the same curve is repeated as L changes by $2D_a$. FIG. 19a is the case for the curved path 5c at $\gamma=45°$; whereas, FIG. 19b is the case for $\gamma=0°$. The case for $0°<\gamma<45°$ has been omitted, but it is similar to that shown in FIG. 19a. As easily seen from FIG. 19a, the movement of the rollers 1 will be most stable if the length is selected to be in the range between (even number+0.2) X $D_a$ and (odd number+0.2) X $D_a$ for the case of $0°<\gamma45°$ and to be (integer+0.2) X $D_a$ for the case of $\gamma\approx0°$.

Figure 20:
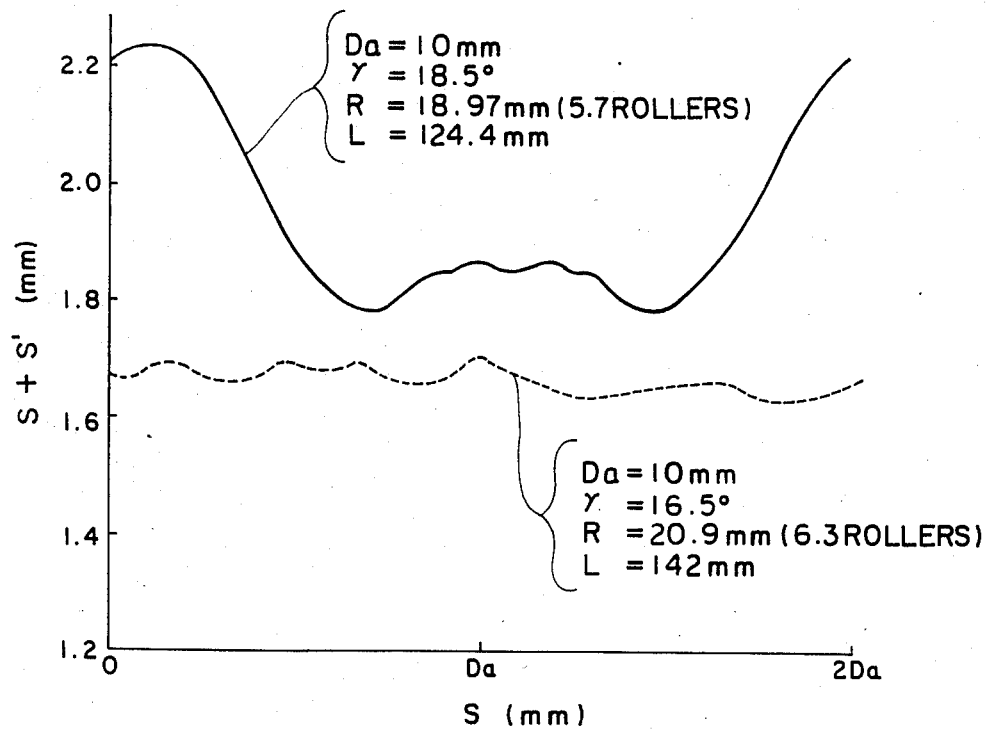
FIG. 20 is a graph showing a comparison between the fluctuation of bearing movements for the present linear motion roller bearing and a prior art linear motion roller bearing.

FIG. 20 shows a comparison in characteristics between the prior art (solid line) and the present (dotted line) linear motion roller bearings. As shown, the rollers 1 of the present linear motion roller bearing move with fluctuations which are approximately 1/6 of the fluctuations present in the prior art linear motion roller bearing.

Figure 21:
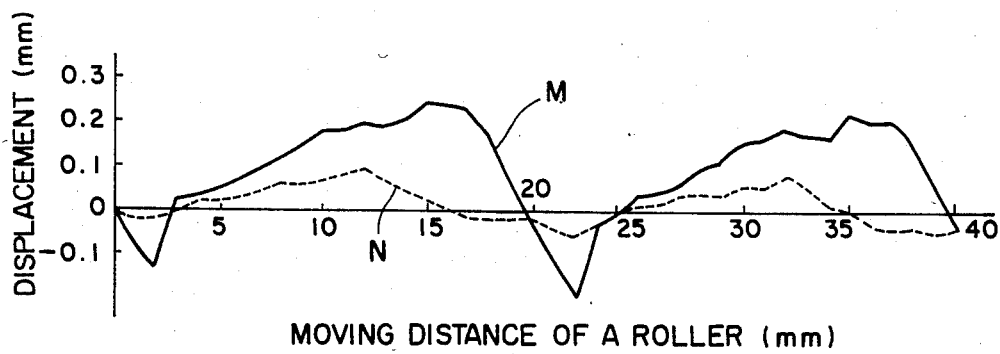
FIG. 21 is a graph showing the measured displacement of the roller at one end of the curved path by $(1 \pm \text{delta})$ mm when the roller at the other end was moved incrementally by 1 mm.
Figure 22:
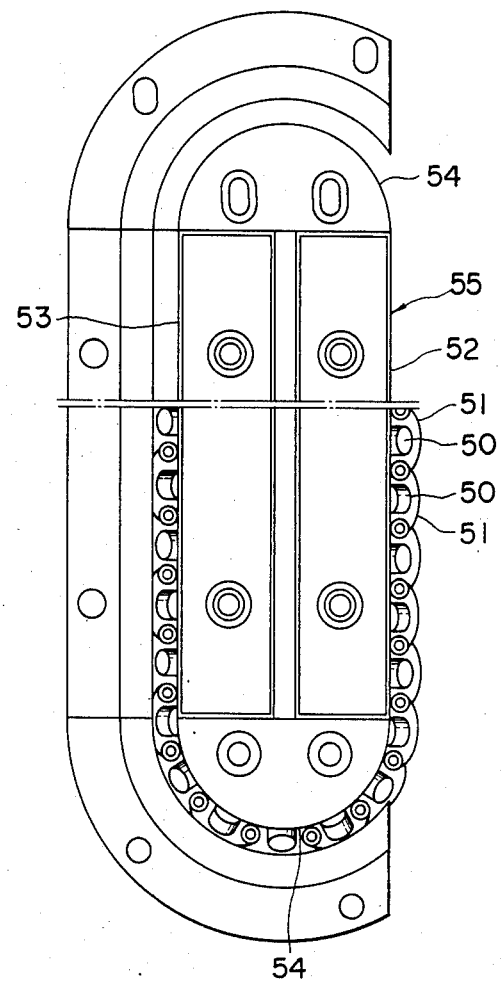
FIGS. 22 and 23 are fragmentary plan and cross-sectional views showing the prior art linear motion roller bearing.
Figure 23:
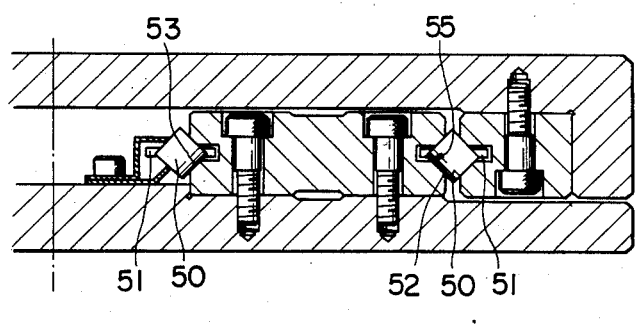

FIG. 21 is a graph showing the actually measured variation in the amount of displacement (ordinate) of the roller 1 at one end of the curved path while the roller 1 at the other end of the curved path was moved incrementally by 1 mm (abscissa) for two different kinds of curved path at $\gamma=18°$ having therein different numbers of rollers. The solid curve M is the case for the curved path having therein 5.3 number of rollers and the dotted curve N is the case of 6.3 number of rollers with the diameter of the rollers being all 10 mm. In the curve M, the difference between the maximum and the minimum is 0.44 mm; whereas, the corresponding difference for the curve N is 0.14 mm. It has been confirmed that the variation is significantly reduced for the number of rollers at (even number+0.3).

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear roller bearing including an endless path and a plurality of rollers having substantially the same size in diameter and height arranged in said endless path in contact between adjacent ones of said rollers having their axes of rotation rotated over 90° alternately with respect to the longitudinal axis of said endless path, said endless path comprising a pair of straight portions which are spaced apart from and in parallel with each other and a pair of curved portions each connecting the corresponding ends of said pair of straight portions, each of said curved portions being so structured that the maximum number of said rollers which can be present in each curved portion ranges between an even number of rollers plus 0.1 to 0.5 of an additional roller if said pair of straight portions are not provided in the same horizontal plane.

2. A linear motion roller bearing as defined in claim 1 wherein each of said pair of curved portions has a semicircular shape.

3. A linear motion roller bearing as defined in claim 1 wherein each of said pair of straight portions has a length ranging between a diameter of said rollers multiplied by an even number plus 0.2 of an additional roller and a diameter of said rollers multiplied by an odd number plus 0.2 of an additional roller.

4. A linear motion roller bearing including an endless path and a plurality of rollers having substantially the same size diameter and height arranged in said endless path in contact between adjacent ones of said rollers and having their axes of rotation rotated over 90° alternately with respect to the longitudinal axis of said endless path, said endless path comprising a pair of straight portions which are spaced apart from each other and in parallel and a pair of curved portions each connecting the corresponding end of said pair of straight portions, each of said curved portions being so structured that the maximum number of said rollers which can be present in each curved portion ranges between an integer number of rollers plus 0.1 of an additional roller if said pair of straight portions are provided in the same horizontal plane or in a plane substantially close thereto.

5. A linear motion roller bearing as defined in claim 4 wherein each of said pair of curved portions has a semiircular shape.

6. A linear motion roller bearing as defined in claim 4 wherein each of said pair of straight portions has a length ranging between a diameter of said rollers multiplied by an integer and a diameter of said rollers multiplied by an integer plus 0.4 of an additional roller.

* * * * *